United States Patent
Chu et al.

(10) Patent No.: US 9,835,264 B2
(45) Date of Patent: Dec. 5, 2017

(54) DIAPHRAGM VALVE FOR VEHICLE

(71) Applicants: HYUNDAI MOTOR COMPANY, Seoul (KR); KIA MOTORS CORPORATION, Seoul (KR)

(72) Inventors: Dong Ho Chu, Ansan-si (KR); Hyung Jin Kim, Seoul (KR); Yong Hoon Kim, Seoul (KR); Teock Hyeong Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/171,399

(22) Filed: Jun. 2, 2016

(65) Prior Publication Data
US 2017/0114923 A1 Apr. 27, 2017

(30) Foreign Application Priority Data

Oct. 27, 2015 (KR) .......... 10-2015-0149266

(51) Int. Cl.
*F16K 31/126* (2006.01)
*F16K 7/17* (2006.01)

(52) U.S. Cl.
CPC ............ *F16K 31/1262* (2013.01); *F16K 7/17* (2013.01)

(58) Field of Classification Search
CPC .............. F16K 31/126; F16K 31/1262; F16K 31/1266; F16K 7/17
USPC ..................... 251/61.2, 61.4, 331
See application file for complete search history.

(56) References Cited

U.S. PATENT DOCUMENTS

| | | | | |
|---|---|---|---|---|
| 3,743,237 A | * | 7/1973 | Kiser ................. | F16K 31/1262 251/25 |
| 4,167,247 A | * | 9/1979 | Sons et al. ............ | B05B 1/267 239/455 |
| 5,829,473 A | * | 11/1998 | Hajbi et al. .......... | F16K 31/126 137/315.28 |
| 7,163,024 B2 | * | 1/2007 | Igawa et al. ........ | F16K 31/1268 137/486 |

(Continued)

FOREIGN PATENT DOCUMENTS

JP 55-134576 U 9/1980
JP 55-181074 U 12/1980

(Continued)

OTHER PUBLICATIONS

Korean office action issued in Application No. 10-2015-0149266 dated Jan. 5, 2017.

*Primary Examiner* — Kevin Lee
(74) *Attorney, Agent, or Firm* — McDermott Will & Emery LLP

(57) ABSTRACT

A diaphragm valve for a vehicle includes: a diaphragm chamber having an upper chamber and a lower chamber divided by a diaphragm and communicating with a valve inlet and a valve outlet. The upper chamber has a nipple in which a fluid flows or from which a fluid is discharged, and the lower chamber has a chamber opening port at a lower end thereof. A valve rod is coupled to the diaphragm and extends toward the valve outlet. A valve head is provided at a position corresponding to an end of the valve rod and has a wider cross sectional area than the valve rod. The valve head closes the valve outlet when the valve is closed, and closes the chamber opening port when the valve is open.

8 Claims, 5 Drawing Sheets

(56) References Cited

U.S. PATENT DOCUMENTS

2015/0129791 A1* 5/2015 Okita et al. ......... F16K 31/1221
　　　　　　　　　　　　　　　　　　　　251/331

FOREIGN PATENT DOCUMENTS

| JP | H10-259764 A | 9/1998 |
| JP | H11-223158 A | 8/1999 |
| KR | 10-2006-0022779 A | 3/2006 |
| KR | 10-2009-0102144 A | 9/2009 |
| KR | 10-2014-0027765 A | 3/2014 |
| KR | 10-2014-0055560 A | 5/2014 |

* cited by examiner

[FIG. 2]

[FIG. 4]
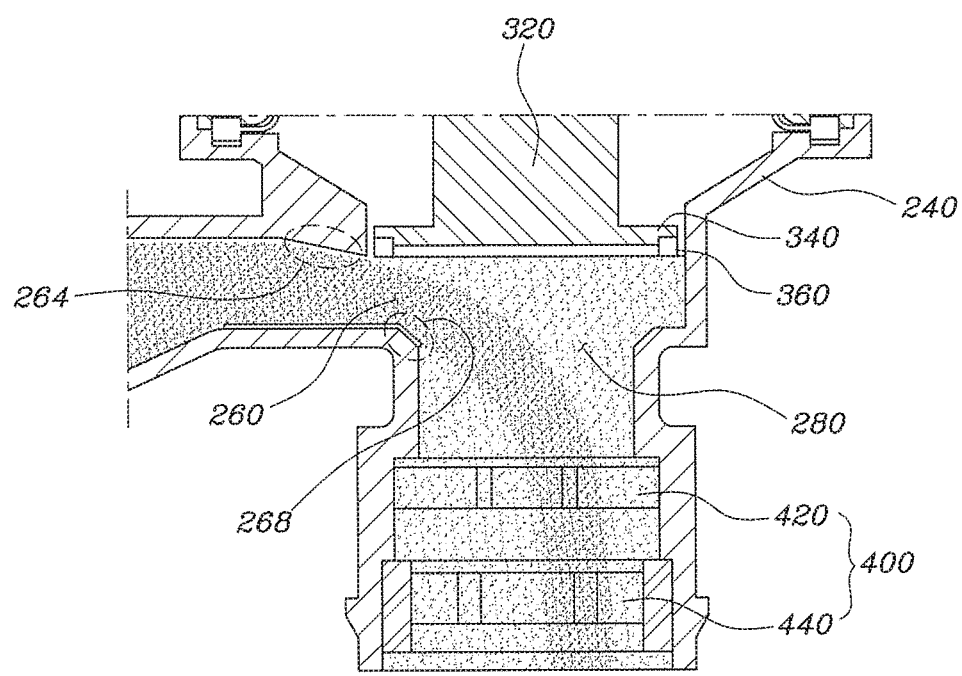

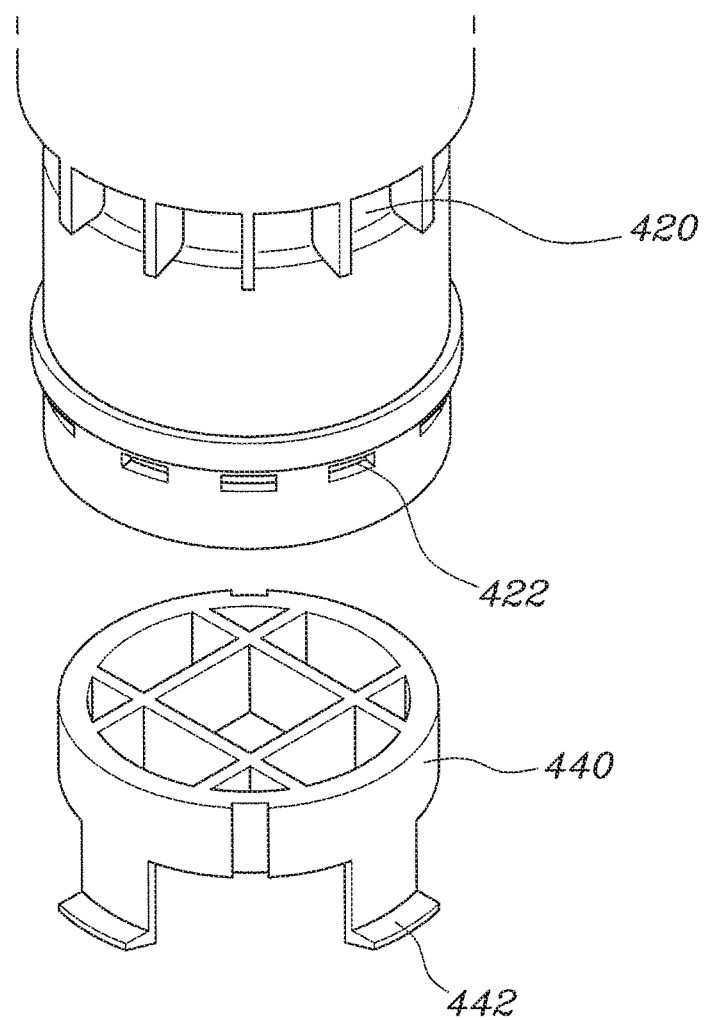
[FIG. 5]

DIAPHRAGM VALVE FOR VEHICLE

CROSS REFERENCE TO RELATED APPLICATION

The present application claims the benefit of priority to Korean Patent Application No. 10-2015-0149266, filed on Oct. 27, 2015, the entire content of which is incorporated herein for all purposes by this reference.

TECHNICAL FIELD

The present disclosure generally relates to diaphragm valves for vehicles, and more particularly, to a diaphragm valve that is operated by a pressure difference generated from an inside of a diaphragm chamber.

BACKGROUND

Generally, a vehicle has various fluids, for example, air, fuel, or the like flowing therein, and various valves are provided in order to control such flow of the fluids. Among these valves, a diaphragm valve, which is referred as a positive displacement valve, controls the flow of a fluid using movement of a diaphragm. The diaphragm is a partitioning sheet having elasticity in a thin film form and is mainly made from a rubber, thin metal plate, or the like.

The diaphragm valve is operated by the movement of the diaphragm resulting from a pressure difference between chambers divided by the diaphragm in a diaphragm chamber. Any one chamber in the diaphragm chamber may communicate with a flow passage of the valve so that a fluid moving in the valve for the formation of pressure can flow in the chamber.

However, the chamber formed to communicate with the flow passage of the valve for the formation of pressure is problematic because the fluid flows in the diaphragm chamber when the valve is open in which the pressure forms vortex and turbulent flow. Thus, the fluid causes a rapid flow change in the valve before being discharged from the valve, thereby generating noise.

In addition, durability of the diaphragm is reduced due to the flow of the fluid while forming vortex and turbulent flow in the diaphragm chamber when the valve is open.

The foregoing is intended merely to aid in the understanding of the background of the present disclosure, and is not intended to mean that the present disclosure falls within the purview of the related art that is already known to those skilled in the art.

SUMMARY

An object of the present disclosure is to provide a diaphragm valve for a vehicle, which is capable of effectively reducing occurrence of noise of the diaphragm valve and increasing durability of a diaphragm.

According to one embodiment in the present disclosure, a diaphragm valve for a vehicle includes: a diaphragm chamber having an upper chamber and a lower chamber divided by a diaphragm and communicating with a valve inlet and a valve outlet. The upper chamber has a nipple in which a fluid flows or from which a fluid is discharged, and the lower chamber has a chamber opening port at a lower end thereof. A valve rod is coupled to the diagram and extends toward the valve outlet. A valve head is provided at a position corresponding to an end of the valve rod and has a wider cross sectional area than the valve rod. The valve head closes the valve outlet when the valve is closed, and the valve head closes the chamber opening port when the valve is open.

The valve head may seal the lower chamber in which the valve head moves downwards when the valve is closed so that the valve head comes into close contact with a peripheral part of the valve outlet, thereby closing the valve outlet. The valve head moves upwards when the valve is open so that the valve head comes into close contact with a peripheral part of the chamber opening port, thereby closing the chamber opening port.

The diaphragm valve may further include a first guide portion provided at a position corresponding to an upper part of the valve inlet and protruding toward a lower part. A protruding height of the first guide becomes higher as the first guide portion is gradually closer to the valve rod.

The diaphragm valve may further include a second guide portion provided at a position corresponding to a lower part of the valve inlet to have a chamfered shape.

The diaphragm valve may further include a sealer made of an elastic material and provided to protrude from an outer surface of the valve head. The sealer extends along a circumferential direction of the valve head and comes into close contact with a peripheral part of the chamber opening port or the valve outlet.

A mesh layer may be formed in a discharge flow passage connected to the valve outlet and may have a ventilation portion having a grid shape for attenuating noise generated from flow of the fluid.

The mesh layer may have an upper layer and a lower layer each of which has the ventilation portion with the grid shape. The lower layer is rotatable relative to the upper layer to control a grid direction of the ventilation portion of the lower layer.

The valve inlet and the valve outlet may be connected to an inhalation manifold of an engine.

According to the diaphragm valve of a vehicle having the structure describes above, occurrence of noise of the valve can be simply and effectively reduced, and durability of the diaphragm can be also improved.

In particular, when the valve is open, the valve head closes and seals the lower chamber of the diaphragm chamber so that the fluid is prevented from flowing in the diaphragm chamber, and thus, the sharp bending of flow of the fluid is mitigated, thereby reducing the occurrence of noise of the valve, and increasing durability of the diaphragm.

In addition, since the first guide portion and the second guide portion are provided at the valve inlet, when the fluid entering through the valve inlet is discharged to the valve outlet, a change in flow of the fluid can be smoothly performed. Thus, the occurrence of noise resulting from the flow of the fluid can be effectively reduced.

Since the mesh layer divided into the upper layer and lower layer is provided in a flow passage located at the valve outlet such that the lower layer is rotatable relative to the upper layer, noise characteristics of the valve can be adjusted. Thus, it is effective to reduce noise.

BRIEF DESCRIPTION OF THE DRAWINGS

The above and other objects, features and other advantages of the present disclosure will be more clearly understood from the following detailed description when taken in conjunction with the accompanying drawings.

FIG. 4 is a view showing a fluid flow in a diaphragm valve for a vehicle according to an embodiment in the present disclosure.

FIG. 5 is a view showing a mesh layer installed in a diaphragm valve for a vehicle according to an embodiment in the present disclosure.

DETAILED DESCRIPTION

Hereinbelow, exemplary embodiments in the present disclosure will be described in detail with reference to the accompanying drawings.

The present disclosure relates to, particularly, a diaphragm valve provided on an inhalation manifold of a vehicle. The diaphragm valve includes a lower chamber closed by a valve head when the diaphragm valve is open, thereby preventing a fluid from flowing in a diaphragm chamber. Thus, it is advantageous in that a rapid flow change is controlled so that noise can be reduced and durability of a diaphragm can be also improved.

In addition, a first guide portion and a second guide portion are provided so that the flow of a fluid entering through a valve inlet is smoothly curved toward a valve outlet, thereby increasing the effect of a reduction in noise, which may be generated from the valve. Further, a mesh layer is provided in a discharge flow passage connected to the valve outlet so as to be rotatable according to noise characteristics of the fluid so that fluid flow in an unstable state due to formation of vortex and turbulent flow can be stabilized, thereby reducing the occurrence of noise.

Figure 1:
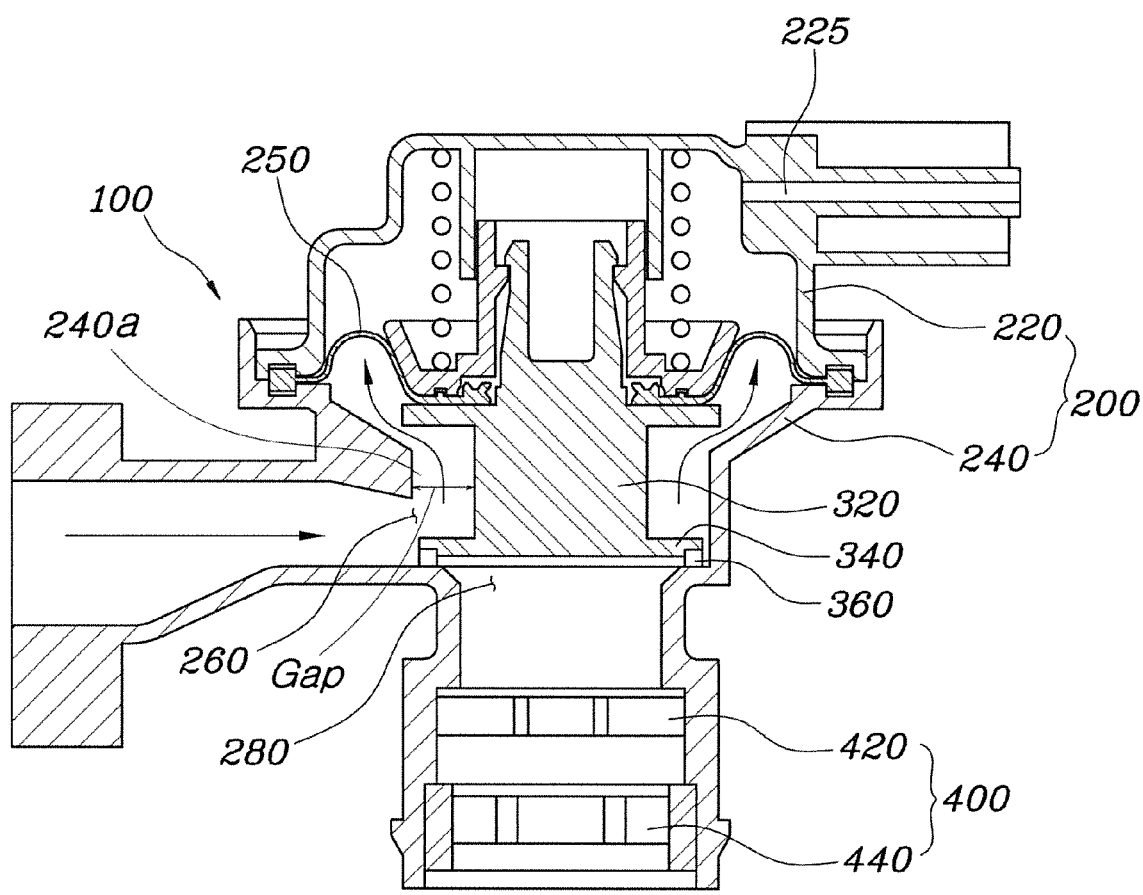
FIG. 1 is a view showing an example in which a diaphragm valve for a vehicle according to an embodiment in the present disclosure is blocked.
Figure 2:
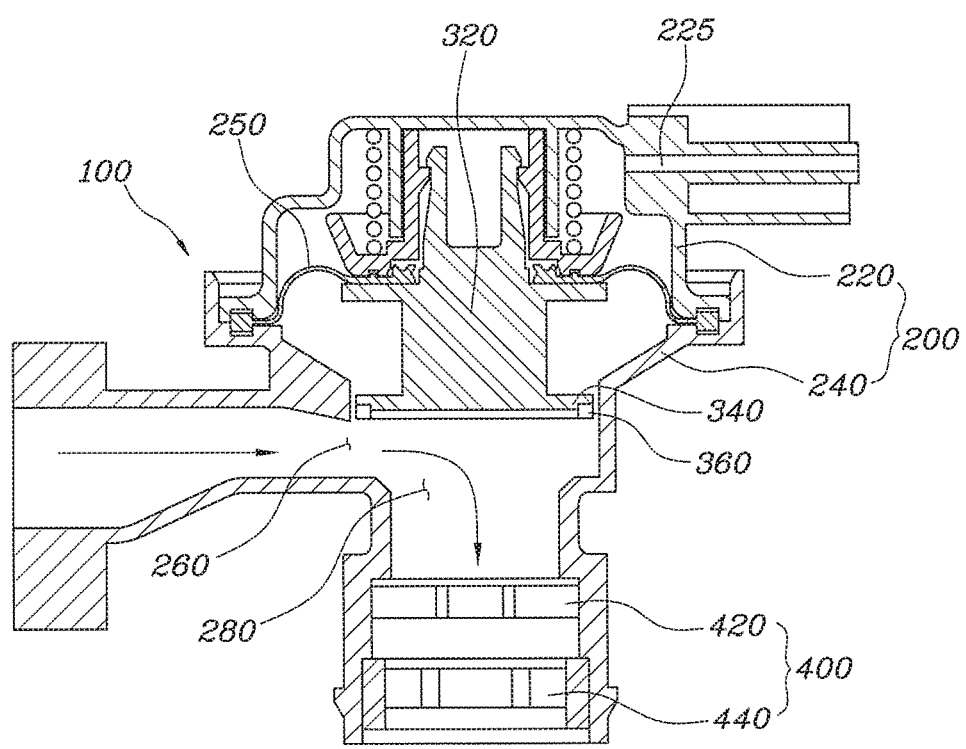
FIG. 2 is a view showing a situation in which a diaphragm valve for a vehicle according to an embodiment in the present disclosure is open.

Referring to FIGS. 1 and 2, a diaphragm valve 100 for a vehicle according to the present disclosure includes: a diaphragm chamber 200 having an upper chamber 220 and a lower chamber 240 divided by a diaphragm 250 and communicating with a valve inlet 260 and a valve outlet 280. The upper chamber 220 has a nipple 225 in which a fluid flows or from which a fluid is discharged, and the lower chamber 240 has a chamber opening port 240a at a lower end thereof. A valve rod 320 is coupled to the diaphragm 250 and extends toward the valve outlet 280. A valve head 340 is provided at a position corresponding to an end of the valve rod 320 and has a wider cross sectional area than that of the valve rod 320. The valve head 340 closes the valve outlet 280 when the diaphragm valve 100 is closed, and the valve head closes the chamber opening port 240a when the diaphragm valve 100 is open.

In detail, the diaphragm chamber 200 includes the upper chamber 220 and the lower chamber 240 which are divided by the diaphragm 250. The upper chamber 220 has the nipple 225 in which the fluid flows or from which the fluid is discharged, and the lower chamber 240 has the chamber opening port 240a provided at the lower end thereof. Thus, the diaphragm chamber 200 communicates with the valve inlet 260 and the valve outlet 280.

The diaphragm 250 may be made of a high elasticity material, for example, rubber or the like, in a thin film form and may divide the diaphragm chamber 200 into the upper chamber 220 and the lower chamber 240. FIGS. 1 and 2 show the upper chamber 220 and the lower chamber 240 divided by the diaphragm 250.

The diaphragm valve 100 is generally operated by movement of the diaphragm 250 resulting from a pressure difference between spaces divided by the diaphragm 250. In the present disclosure, the chamber 240 communicates with the valve inlet 260 and the valve outlet 280 so that an internal pressure of the lower chamber 240 is created by the pressure of the fluid passing through the diaphragm valve 100.

In addition, as the fluid for formation of the pressure flows or is discharged via the nipple 225, the internal pressure of the upper chamber 220 can be controlled. That is, when the fluid in the upper chamber 220 is discharged to outside via the nipple 225, a lower pressure than an internal pressure of the lower chamber 240 is created in the upper chamber 220 so that a central part of the diaphragm 250 moves upwards. Thus, when the fluid flows in the upper chamber 220 via the nipple 225, the upper chamber 220 maintains pressure balance with the lower chamber 240, or a high pressure is generated so that the central part of the diaphragm 250 moves downwards.

The valve rod 320 is coupled to the diaphragm 250 and extends toward the valve outlet 280. The valve rod 320 may be formed in a long bar-like shape and may be made of various materials. Furthermore, the end of the valve rod 320 may be coupled to the diaphragm 250 or may be coupled to the diaphragm 250 while passing through the diaphragm 250. The coupling method between the valve rod and the diaphragm may be variously changed.

The valve rod 320 coupled to the diaphragm 250 moves with the diaphragm 250 according to a vertical movement of the diaphragm 250. FIG. 1 shows a situation in which as a high pressure is created in the upper chamber 220, the diaphragm 250 performs downward movement so that the valve rod 320 moves downwards, whereby the valve outlet 280 is closed. FIG. 2 shows a situation in which as a low pressure is created in the upper chamber 220, the diaphragm 250 performs upward movement so that the valve rod 320 moves upwards, whereby the valve outlet 280 is open.

A cross sectional area of the valve rod 320 may be smaller than that of the chamber opening port 240a so that a gap can be formed between the valve rod 320 and the chamber opening port 240a. Since the chamber opening port 240a is closed by the valve head 340 rather than the valve rod 320, and is provided so that the fluid flows via the gap between the valve rod 320 and the chamber opening port 240a, an internal pressure by the fluid may be always created in the lower chamber 240.

In addition, the valve rod 320 may extend by passing through the chamber opening port 240a. As shown in FIGS. 1 and 2, the valve outlet 280 may be provided at a position corresponding to a lower part of the chamber opening port 240a, and the valve rod 320 coupled to the central part of the diaphragm 250 may face the valve outlet 280 by passing through the chamber opening port 240a and extending. Thus, the valve head 340 can come into close contact with the chamber opening port 240a or the valve outlet 280.

The valve head is provided at the position corresponding to the end of the valve rod 320 and has a wider cross sectional area than that of the valve rod 320. The valve head 340 closes the valve outlet 280 when the diaphragm valve 100 is closed, and closes the chamber opening port 240a when the valve 100 is open.

In order to prevent the valve rod 320 from disturbing the flow of fluid flowing to the lower chamber 240 when the valve 100 is closed, the cross sectional area of the valve rod 320 is formed smaller than that of the chamber opening port 240a. A cross sectional area of the valve head 340, provided at the position corresponding to the end of the valve rod 320 and intended for closing the chamber opening port 240a and the valve outlet 280, is formed greater than that of the valve rod 320.

Furthermore, the chamber opening port 240a may be formed at a position corresponding to a lower part of the diaphragm 250, and the valve outlet 280 may be formed at a position corresponding to a lower part of the chamber opening port 240a. The valve rod 320 may be coupled to the diaphragm 250 and may extend vertically so that the valve head 340, provided at the position corresponding to the end of the valve rod 320, reciprocally moves between the valve outlet 280 and the chamber opening port 240a according to vertical movements of the diaphragm 250 and the valve rod 320.

Accordingly, in order to close the diaphragm valve 100, a relatively high pressure is created in the upper chamber 220. Thus, when the diaphragm 250 and the valve rod 320 perform downward movements, the valve head 340 is also moved downwards so that the valve head 340 comes into close contact with a peripheral part of the valve outlet 280, wherein the chamber opening port 240a forms an open state.

As a result, as the valve outlet 280 is closed, flow of the fluid passing through the valve is blocked, and the fluid flows in the lower chamber 240 via the open chamber opening port 240a so that pressure of the fluid forms the internal pressure of the lower chamber 240.

In addition, when a relatively low pressure is created in the upper chamber 220 in order to open the diaphragm valve 100 so that the diaphragm 250 and the valve rod 320 perform upward movements, the valve head 340 is also moved upwards so that the valve head 340 can be located to come into close contact with the peripheral part of the chamber opening port 240a, wherein the valve outlet 280 is in the open state.

As the valve outlet 280 is open, although the flow of the fluid passing through the diaphragm valve 100 occurs, the fluid does not flow in the lower chamber any longer because the chamber opening port 240a is closed. Thus, vortex and turbulent flow resulting from flow of the fluid may be prevented from occurring in the lower chamber 240 so that the occurrence of noise can be reduced, and durability of the diaphragm 250 can be also improved.

A chamber may be formed in a section in which the valve head 340 performs reciprocating movement, wherein the chamber may have the same cross sectional area as that of the valve head 340 or may have a cross sectional area provided to such an extent as to form a gap with the valve head. Accordingly, the fluid flowing in the valve upon opening the diaphragm valve 100 can be prevented from generating vortex and turbulent flow by causing unnecessary flow in a space between the chamber opening port 240a and the valve outlet 280.

Figure 3:
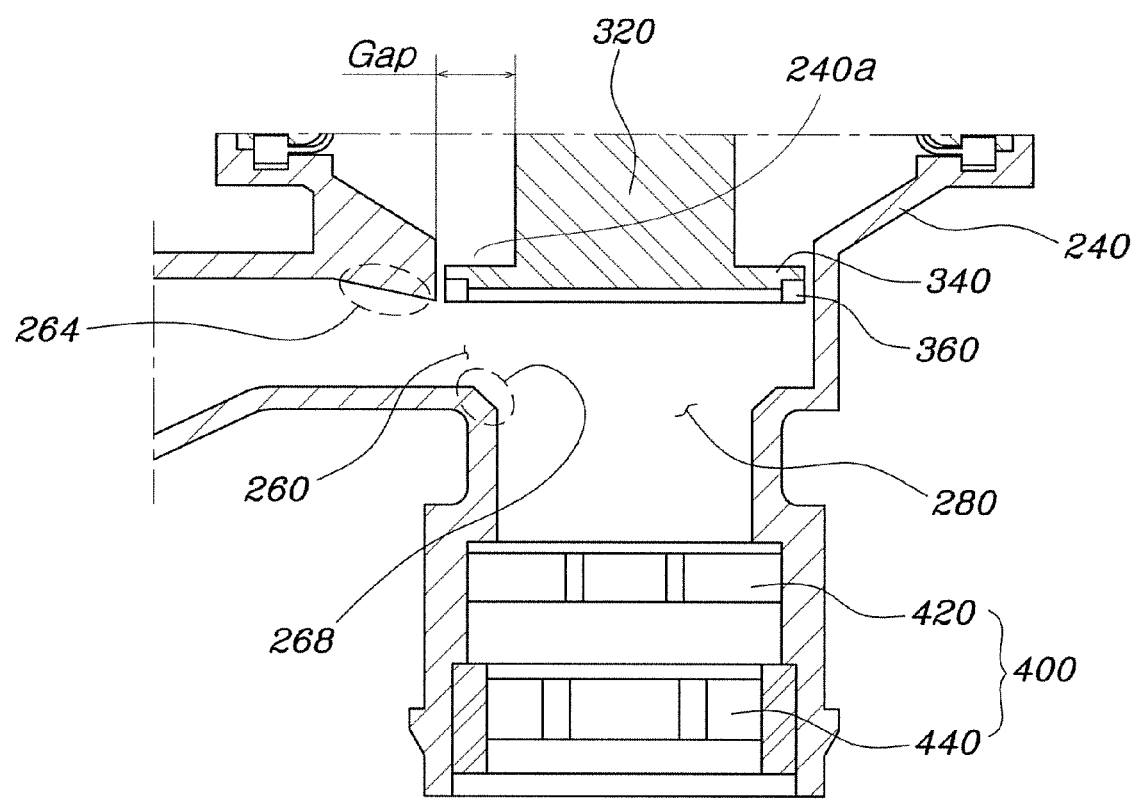
FIG. 3 is a view showing a first guide portion and a second guide portion installed in a diaphragm valve for a vehicle according to an embodiment in the present disclosure.

Referring to FIGS. 3 and 4, the diaphragm valve 100 further includes a first guide portion 264 provided at a position corresponding to an upper part of the valve inlet 260 and protruding toward a lower part, so that a protruding height of the first guide portion 264 becomes higher as the first guide portion 264 is gradually closer to the valve rod 320.

In detail, the first guide portion 264 is provided at the position corresponding to the upper part of the valve inlet 260 and protrudes toward the lower part, thereby guiding the flow of the fluid flowing via the valve inlet 260 toward the valve outlet 280 provided at the position corresponding to the lower part of the diaphragm valve 100. FIG. 3 illustrates that the first guide portion 264 has the diaphragm valve 100, and FIG. 4 illustrates the flow of the fluid that is guided by the first guide portion 264.

Furthermore, the protruding height of the first guide portion 264 becomes higher as the first guide portion is gradually closer to the valve rod 320. The protruding height of the first guide portion 264 may be continuously higher toward the valve rod 320 so that the first guide portion 264 can guide flow of the fluid so that the fluid passing through the valve inlet 260 can naturally move toward the valve outlet 280.

Referring to FIGS. 3 and 4, the diaphragm valve 100 further includes a second guide portion 68 that is provided at a position corresponding to a lower part of the valve inlet 260 to have a chamfered shape.

In detail, the second guide portion 268 is provided at the position corresponding to the lower part of the valve inlet 260 and has a chamfered shape that faces the valve outlet 280, thereby guiding flow of the fluid flowing via the valve inlet 260 toward the valve outlet 280, which may be provided at the position corresponding to the lower part of the diaphragm valve 100.

Furthermore, a depth of the second guide portion 268 becomes deeper as the second guide portion 268 is gradually closer to the valve rod 320. The depth of the second guide portion 268 may be continuously deeper toward the valve rod 320 so that the second guide portion can guide a flow direction of the fluid in such a manner that the fluid entering via the valve inlet 260 generates natural bending while moving toward the valve outlet 280.

Referring back to FIGS. 1 and 2, the diaphragm valve 100 further includes a sealer 360 that is made of an elastic material and protrudes from an outer surface of the valve head 340. The sealer extends along a circumferential direction of the valve head 340 and comes into close contact with a peripheral part of the chamber opening port 240a or the valve outlet 280.

In detail, the sealer 360 may be made of an elastic material, for example, rubber, plastic, or the like, and may protrude from the outer surface of the valve head 340. In addition, the sealer may have a rib-like shape extending along a circumferential direction of the valve head 340.

The sealer 360 is disposed at a portion of the outer surface of the valve head 340, the portion coming into contact with the peripheral part of the chamber opening port 240a or the valve outlet 280. Thus, a closing function of the valve outlet 280 or the chamber opening port 240a of the valve head 340 may be enhanced so that performance of the diaphragm valve 100 can be improved. FIGS. 1 and 2 are views showing that the sealer 360 is formed at the portion in the valve head 340 contacting the peripheral part of the valve outlet 280.

Referring to FIG. 1 or FIG. 5, the diaphragm valve 100 has the mesh layer 400 that is formed in the discharge flow passage connected to the valve outlet 280 and has a ventilation portion having a grid shape, for attenuating noise generated from flow of the fluid.

In detail, the mesh layer 400, as shown in FIG. 5, has the ventilation portion with the grid shape and is provided in the discharge flow passage of the fluid. Further, the mesh layer 400 may be made of various materials and may integrally include the discharge flow passage or may be provided in a coupling manner. FIG. 1 shows that, in the diaphragm valve 100 for a vehicle according to the present disclosure, the mesh layer 400 is formed in the discharge flow passage.

The fluid, which is discharged to the discharge flow passage by passing through the diaphragm valve 100, may cause noise during flowing while being discharged in an unstable state according to a rapid change in its flow direction in the diaphragm valve 100. Accordingly, the mesh layer 400 in which the ventilation portion with the grid shape is formed is provided in the discharge flow passage so that turbulence flow of fluid can be stabilized, thereby reducing noise.

In the diaphragm valve 100 for a vehicle according to the present disclosure, the mesh layer 400 may have an upper layer 420 and a lower layer 440 each having the ventilation portion with the grid shape. The lower layer 440 is rotatable relative to the upper layer 420 so that a grid direction of the ventilation portion can be controlled.

In detail, the mesh layer 400 is divided into the upper layer 420 and the lower layer 440, and the ventilation portion with the grid shape is formed in each layer. However, the lower layer 440 may be rotatable relative to the upper layer 420 so that a grid direction of the upper layer 420 and a grid direction of the lower layer 400 can be controlled to be different from each other.

The mesh layer 400 is provided in order to stabilize the unstable flow of the fluid discharged from the diaphragm valve 100. According to a detailed shape of the diaphragm valve 100 and characteristics of the fluid, when a grid direction of the mesh layer is controlled to be matched with noise characteristics of the fluid discharged via the valve outlet 280, the effect of a reduction in noise can be improved.

In addition to this, when the mesh layer 400 in which the ventilation portion with the grid shape is formed is divided into the upper layer 420 and the lower layer 440, the lower layer 440 is rotatable relative to the upper layer 420 so that the grid directions of the upper layer 420 and the lower layer 440 can be individually set to be matched with characteristics of the fluid passing through the diaphragm valve 100, thereby maximizing the effect of a reduction in noise.

The upper layer 420 and the lower layer 440 may be rotatably provided. As one embodiment in the present disclosure, in order to maintain the grid direction determined matched with the noise characteristic of the fluid, the upper layer 420 may be fixedly provided in the discharge flow passage, and the lower layer 440 may be rotatably provided in the discharge flow passage. Further, the lower layer 440 may be fixed to a lower part of the upper layer 420 so that the grid direction determined according to the noise characteristic of the fluid can be fixed.

The coupling method of the upper layer 420 and the lower layer 400 may vary. As one embodiment in the present disclosure, referring to FIGS. 4 and 5, the upper layer 420 and the lower layer 400 are coupled to each other in a hook coupling method. Therefore, hook receiving portions 422 are formed at a position corresponding to a lower part of the upper layer 420 the number of hook receiving portions 422 is great than the number of hooks 442 provided at the lower layer 440 to couple the lower layer 440 can to the upper layer 420 by rotating.

Thus, after the grid direction is determined, the lower layer 440 is hook-coupled to the hook receiving portions 422 of the upper layer 420 corresponding to the position so as to hold a fixed state.

Further, in the diaphragm valve 100, the valve inlet 260 and the valve outlet 280 communicate an inhalation manifold of an engine.

When an high pressure is created in the lower chamber 240, the diaphragm valve 100 can be more easily operated. Accordingly, in the case where fluid flow with high pressure is controlled, efficiency is increased. According to such an operational characteristic, suction air of the high pressure may be connected to the flowing inhalation manifold in order to increase combustion efficiency.

When the fluid flowing with high pressure is controlled so that a throttle valve controlling the quantity of suction air instantaneously reduces the quantity of air according to a driving environment for a vehicle, in order to prevent the fluid with high pressure from causing a shock in the manifold by a momentary change in the quantity of suction air, the fluid with high pressure may be used in cushioning the shock of the inhalation manifold by re-transmitting a part of the suction air entering in the inhalation manifold to an upstream of the inhalation manifold upon a sudden reduction in the quantity of suction air.

Although some embodiments have been described for illustrative purposes, those skilled in the art will appreciate that various modifications, additions, and substitutions are possible, without departing from the scope and spirit of the invention as disclosed in the accompanying claims.

What is claimed is:

1. A diaphragm valve for a vehicle comprising:
   a diaphragm chamber having an upper chamber and a lower chamber divided by a diaphragm and having a valve inlet and a valve outlet such that the lower chamber communicates with the valve inlet and the valve outlet, the upper chamber having a nipple in which a fluid flows or from which the fluid is discharged and the lower chamber having a chamber opening port at a lower end of the lower chamber;
   a valve rod coupled to the diaphragm and extending toward the valve outlet; and
   a valve head provided at a position corresponding to an end of the valve rod and having a wider cross sectional area than that of the valve rod, the valve head closing the valve outlet when the valve is closed and closing the chamber opening port when the valve is open.

2. The diaphragm valve of claim 1, wherein the valve head seals the lower chamber in which the valve head moves downwards when the valve is closed so that the valve head comes into contact with a peripheral part of the valve outlet to close the valve outlet, and
   wherein the valve head moves upwards when the valve is open so that the valve head comes into contact with a peripheral part of the chamber opening port to close the chamber opening port.

3. The diaphragm valve of claim 1, further comprising:
   a first guide portion provided at a position corresponding to an upper part of the valve inlet and protruding toward a lower part,
   wherein a protruding height of the first guide portion increase toward the valve rod.

4. The diaphragm valve of claim 3, further comprising:
   a second guide portion provided at a position corresponding to a lower part of the valve inlet and having a chamfered shape.

5. The diaphragm valve of claim 1, further comprising:
   a sealer made of an elastic material and protruding from an outer surface of the valve head,
   wherein the sealer extends along a circumferential direction of the valve head and comes into contact with a peripheral part of the chamber opening port or the valve outlet.

6. The diaphragm valve of claim 1, wherein a mesh layer is formed in a discharge flow passage that is connected to the valve outlet and has a ventilation portion having a grid shape for attenuating noise generated from flow of the fluid.

7. The diaphragm valve of claim 6, wherein the mesh layer has an upper layer and a lower layer, each of which has the ventilation portion with the grid shape,
 wherein the lower layer is rotatable relative to the upper layer to control a grid direction of the ventilation portion of the lower layer.

8. The diaphragm valve of claim 1, wherein the valve inlet and the valve outlet are connected to an inhalation manifold of an engine.

* * * * *